United States Patent [19]

Burzdak

[11] 4,174,586
[45] Nov. 20, 1979

[54] BUG CATCHER

[76] Inventor: Louis Burzdak, 2619 Sepulveda Blvd., Apt. No. 8, Los Angeles, Calif. 90064

[21] Appl. No.: 915,317

[22] Filed: Jun. 14, 1978

[51] Int. Cl.² ............................................. A01M 3/00
[52] U.S. Cl. .................................... 43/134; 294/99 R
[58] Field of Search ................. 43/134, 135; 119/154; 294/8.5, 11, 33, 99 R

[56] References Cited

U.S. PATENT DOCUMENTS

| 349,394 | 9/1886 | Heidt | 294/11 |
|---|---|---|---|
| 818,465 | 4/1906 | Price | 294/8.5 |
| 2,541,819 | 2/1951 | Hudson | 294/33 |
| 2,647,006 | 7/1953 | Coyle | 294/8.5 |
| 3,356,405 | 12/1967 | Gruber | 294/33 X |

FOREIGN PATENT DOCUMENTS

| 21604 of 1893 | United Kingdom | 43/135 |
|---|---|---|
| 26338 of 1909 | Greece | 43/134 |

Primary Examiner—Nicholas P. Godici
Attorney, Agent, or Firm—W. Edward Johansen

[57] ABSTRACT

The present invention is an improved bug catcher which enables a person to capture an insect without killing or injuring it in order that he may set the insect free outdoors. The improved bug catcher includes a platform member and a semispherical member which is mechanically adapted to be enclosed by the platform member. The improved bug catcher also includes a first elongated member which is mechanically coupled to the platform member at one end and a second elongated member which is mechanically coupled to the semispherical member at one end. The improved bug catcher further includes a hinge which pivotally couples the ends of the two elongated members which are oppositely disposed to the ends thereof to the platform member and the semispherical member. The semispherical member is generally formed from a clear plastic in order to allow the person to view the entrapped insect. The hinge includes a spring which is mechanically coupled to the two elongated members in order to spring bias them so that they will separate when the person releases them. The platform member may be a solid rectangular member or a rectangular piece of wire screen mesh which is adapted so that the person may trap an insect in the sand outdoors.

3 Claims, 2 Drawing Figures

BUG CATCHER

BACKGROUND OF THE INVENTION

1. Field of the Invention

The present invention relates to insect catching devices and more particularly to an improved bug catcher which does not kill the insect while it is being trapped.

2. Description of the Prior Art

U.S. Pat. No. 4,052,811, entitled Insect Catching Device, issued to Esther B. Shuster and Jacob Shuster on Oct. 11, 1977, teaches an insect catching device which includes a rigid body, a resilient support projecting from the rigid body, a flexible sheet of material having a tacky surface which is anchored to the resilient support and the rigid body in overlying support so that a portion of the tacky surface is exposed in order to catch insects. These insects are killed when they are removed from this device.

U.S. Pat. No. 3,996,690, entitled Combination Insect Trap and Swatter Device, issued to Ronald W. Ridings on Dec. 14, 1976, teaches a combination insect trap and swatter which includes a walled receptacle with an entrance for insects, a swatter apparatus, and a flexible arm which is mechanically coupled to the walled receptacle so that it can effect the closure of the swatter apparatus against the walled member's top wall thereby killing the entrapped insects.

U.S. Pat. No. 1,099,342, entitled Fly Catcher, issued to Bert O. Copenhaver on June 9, 1914 teaches a fly catcher which includes two members which are mechanically coupled together by a coupling apparatus which pivotally couples the two members.

U.S. Pat. No. 5,726, entitled Fly-Trap, issued to Wilson Shreve on Aug. 22, 1848, teaches a platform member and a semicylindrical member which are pivotally coupled together so that the semicylindrical member may closed in order to trap insect within. This device is a stationary device and is not very useful in collecting insects.

U.S. Pat. No. 1,664,762, entitled Insect Destroyer, issued to Herman E. Voss on Apr. 3, 1928, teaches an insect destroyer which includes two elongated, rectangular platform members which are hinged together so that they may be brought together in order to kill entrapped insects.

U.S. Pat. No. 210,163, entitled Improvement in Potato-Bug Catchers, issued to Conrad P. Steinmetz on Nov. 19, 1878, teaches a potato bug catcher which has two concave members that match and fit together in order to be brought together so they can crush a potato bug therein.

All of the above patents describe devices which are used to capture and kill insects. Many individuals do not wish to kill insects, but merely to remove them from a particular premise. Other individuals wish only to capture insects in order to study them and free them soon thereafter. Many devices for capturing insects are complicated and expensive. There are no inexpensive and easy to use devices for capturing insects for viewing and studying without injuring the insects. There are also no devices for capturing insects which are hiding under a layer of sand that may be used efficiently.

SUMMARY OF THE INVENTION

In view of the foregoing factors and conditions characteristic of the prior art it is a primary object of the present invention to provide an improved bug catcher which entraps an insect so that a person may view and study it and then set it free.

It is another object of the present invention to provide an improved bug catcher that can entrap an insect that is hiding underneath a layer of sand.

It is still another object of the present invention to provide an improved bug catcher that is easy to use and that is inexpensive to manufacture.

In accordance with an embodiment of the preferred embodiment of the present invention an improved bug catcher which enables a person to capture an insect without killing or injuring it in order that he may set the insect free outdoors is described. The improved bug catcher includes a platform member and a semispherical member which is mechanically adapted to be enclosed by the platform member. The improved bug catcher also includes a first elongated member which is mechanically coupled to the platform member at one end and a second elongated member which is mechanically coupled to the semispherical member at one end. The improved bug catcher further includes a hinge which pivotally couples the ends of the two elongated members which are oppositely disposed to the ends thereof to the platform member and the semispherical member. The semispherical member is generally formed from a clear plastic in order to allow the person to view the entrapped insect. The hinge includes a spring which is mechanically coupled to the two elongated members in order to spring bias them so that they will separate when the person releases them. The platform member may be a solid rectangular member or a rectangular piece of wire screen mesh which is adapted so that the person may trap an insect in the sand outdoor.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
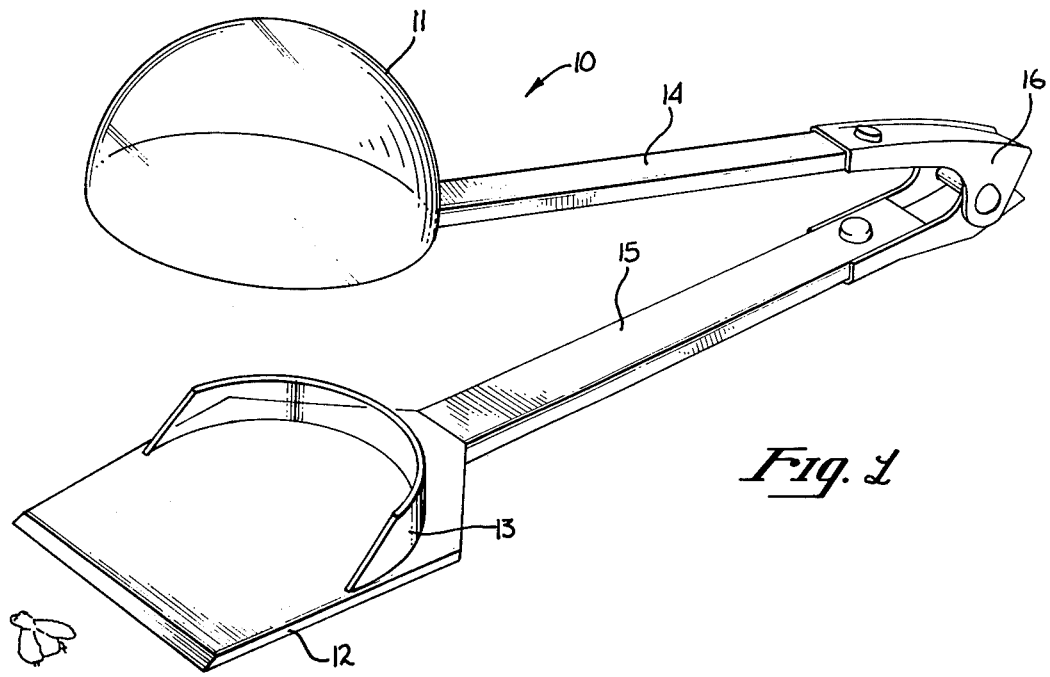
FIG. 1 is a perspective view of the improved bug catcher which has been constructed in accordance with the principles of the present invention.
Figure 2:
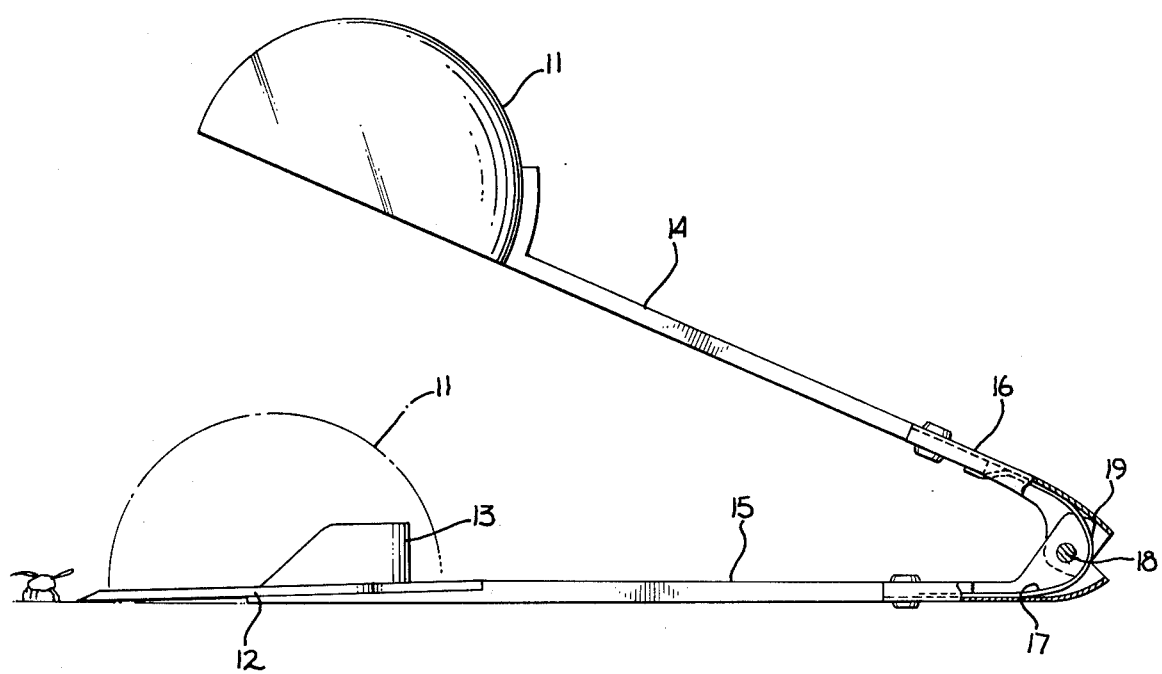
FIG. 2 is a transverse cross-sectional view of the improved bug catcher of FIG. 1 along the line 2—2.

In order to best understand the present invention it is necessary to review the foregoing description of its preferred embodiment in conjunction with reference to the accompanying drawing. The present invention is an improved bug catcher 10 which captures an insect without killing it in order that a person may set it free outdoors. The improved bug catcher 10 includes a semispherical member 11 which has an open bottom and a platform member 12 with a shielding member 13 orthogonally disposed on the surface of the platform member 12. The platform member 12 has an angularly cut end which enables a person to scoop up an insect. The shielding member 13 acts to impede the progress of the insect on the platform member 12 which is adapted to enclose the semispherical member 11, which in the preferred embodiment is formed from a clear plastic so that the person may view the captured insect. In another embodiment the semispherical member 11 is formed out of metal. The improved bug catcher also includes a first elongated arm 14 which is mechanically coupled to the spherical member 11 at one end thereof and a second elongated member 15 which is mechanically coupled to the platform member 12 at one end thereof. The improved bug catcher 10 further includes a hinge 16 which pivotally couples the ends, which are oppositely disposed from the ends mechanically coupled to the platform member 12 and the semispherical member 11, of the first and second elongated members 14 and 15 and a spring 17 which resiliently couples the first elongated member 14 to the second elongated member 15 so that they resiliently pivot about an axis defined by a pin 18. When the hinge 16 is distinct member and not an integral portion of the first and second elongated members 14 and 15, a stop flange 19 may be disposed within the hinge 16 in order to limit the pivotal motion of the two elongated members 14 and 15.

In other embodiments of the improved bug catcher 10 it may be formed as one integral member out of plastic. The improved bug catcher 10 may also include a platform member 12 which is a wire screen mesh which is adapted so that a person may catch insects in the sand outdoor. The platform member 12 may also be a semispherical member which is also formed out of clear plastic and which is adapted to engage the peripheral edge of the spherical member 11 in contiguous contact with its own peripheral edge.

From the foregoing it can be seen that an improved bug catcher has been described which includes a pair of elongated members which are pivotally coupled together at their ends and which are mechanically coupled to a platform member and a spherical member having an open bottom which is adapted to be enclosed by the platform member. The advantage of the improved bug catcher is that it entraps insects without killing them so that a person may view them and then set them free. Another advantage of the improved bug catcher is that not only is it is easy to use, but it is also inexpensive to manufacture.

Accordingly it is intended that the foregoing disclosure and showing made in the drawing shall be considered only as illustrations of the present invention. Furthermore it should be noted that the sketches are not drawn to scale and that distances of and between the figures are not to be considered significant. The invention will be set forth with particularity in the appended claims.

I claim:

1. An improved bug catcher which captures an insect without killing it in order to that a person may set it free outdoors, said improved bug catcher comprising:
   a. a flat platform member which has an angularly cut end surface which enables the person to scoop up the insect;
   b. a hollow semispherical member which has an open bottom and which is adapted to be enclosed by said platform member;
   c. a first elongated member which is mechanically coupled to said platform member at one end thereof;
   d. a second elongated member which is mechanically coupled to said semispherical member at one end thereof;
   e. a shielding member comprising an upwardly disposed wall adjacent to the end opposite the angularly cut end of said platform member thereon in order to provide a stop for the insect so that the person's quick scooping action will not cause him to allow the insect to avoid being entrapped between said platform member and said semispherical member; and
   f. coupling means for pivotally coupling the ends of said first and second elongated members oppositely disposed from the ends thereof to which said semispherical member and said platform members are mechanically coupled.

2. An improved bug catcher according to claim 1 wherein said coupling means comprises:
   a. a hinge which is adapted so that said elongated members may pivot about the axis of said hinge in order so that the person may enclose an insect within said semispherical member; and
   b. resilient means for spring biasing said hinge so it will cause said elongated members to separate when the person releases them.

3. An improved bug catcher according to claim 1 wherein said semispherical member is formed from metal.

* * * * *